Aug. 30, 1932.          D. K. CASON, JR          1,874,445

SELF ALIGNING PITMAN HEAD

Filed March 23, 1927

Dick K. Cason, Jr. Inventor

By Jesse R. Stone
his Attorney

Patented Aug. 30, 1932

1,874,445

UNITED STATES PATENT OFFICE

DICK K. CASON, JR., OF HOUSTON, TEXAS

SELF-ALIGNING PITMAN HEAD

Application filed March 23, 1927. Serial No. 177,657.

My invention relates to a bearing for a pitman head which is adapted for connection with the wrist pin upon an operating crank arm.

The device is particularly adapted for use on standard rigs in well pumping and drilling, although its use is not confined to that particular field. In standard rigs of this character, it is difficult to keep the walking beam to which the upper end of the pitman is attached in proper alignment with the crank arm to which the lower end of the pitman is engaged. When these parts are out of alignment, there is usually excessive wear in the bearings between the pitman and the wrist pin, due to the binding action of the bearings when out of alignment.

It is an object of my invention to provide a bearing for the pitman head which will fit upon the wrist pin in the usual manner but which will allow the operation of the walking beam by means of the pitman without excessive wear even where the parts are out of alignment.

It is also desired to provide means to disengage the pitman from the crank arm with a minimum manipulation and in such manner as to allow the bearing to remain upon the wrist pin.

The invention also includes the particular construction and mounting of the bearing upon the wrist pin which allows the wrist pin to be driven within the crank arm without removing the bearing and in a most effective manner.

Other objects and advantages reside in the particular construction and arrangement of parts and will be set out with particularity in the description which follows.

Figure 1:
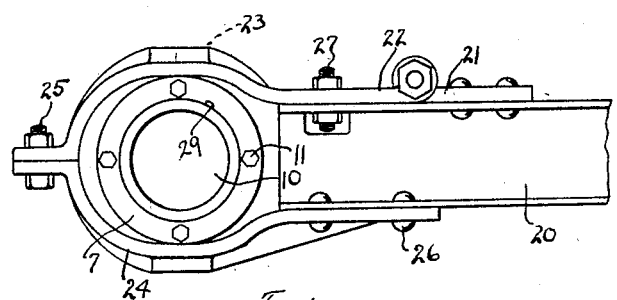
Figure 2:
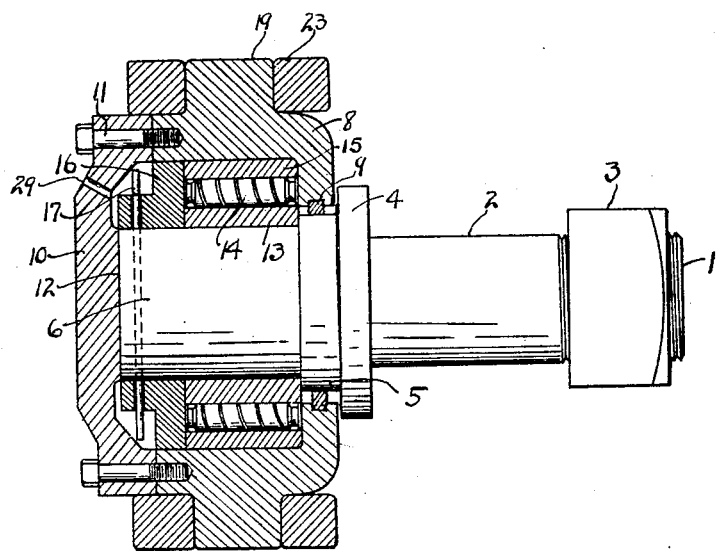

Referring to the drawing herewith, Fig. 1 is a side elevation of my improved pitman head and bearing. Fig. 2 is a transverse section through the bearing showing the same in position upon a wrist pin. Like numerals refer to like parts in both views.

In the drawing I have shown a wrist pin 1 to which my improved pitman connection may be attached. This wrist pin has a cylindrical portion 2 adapted to extend through the opening in the crank arm, shaped to receive it. A nut 3 on the inner end of the pin may be secured in position when the wrist pin has been placed within the crank arm. On the outer portion of the wrist pin is a radial flange 4 adapted to fit against the outer portion of the crank arm and to limit the position of the wrist pin relative thereto. On the outer side of said flange 4 is a bearing shoulder 5 of somewhat smaller diameter and beyond this cylindrical portion 5 the wrist pin is provided with a seat 6, upon which the pitman bearing may engage.

The pitman bearing is ring-shaped, as shown at 7 in Fig. 1. The ring-shaped member comprises a housing, the inner side 8 of which is extended inwardly to fit about the portion 5 of the bearing shoulder. An opening through which the wrist pin extends has a packing ring 9 therein to fit closely about the wrist pin and prevent escape of lubricant therefrom. The forward side of the housing 8 has thereon a plate 10, which is removably secured thereto by cap screws 11. Said plate is dished outwardly to fit around the end of the bearing centrally thereof and has an inwardly extending boss 12, which when the bearing is in position, is adapted to fit closely against the outer end of the wrist pin.

The bearing proper within the housing 8 is preferably of some non-friction type and I have shown an inner bearing ring 13 to fit about the wrist pin with roller bearings 14 of ordinary construction around the said bearing ring 13. Outside the bearings 14 is a second ring 15 of bearing material, the two rings 13 and 15 providing a race within which the rollers 14 may roll. A washer 16 about the wrist pin secures the bearings in position, as shown in Fig. 2, and a cotter pin 17 extending through said washer and said wrist pin prevents the accidental removal of the bearings from the pin.

The bearing housing 8 has two opposite trunnions 19 thereon, which may be received between the opposite arms of a yoke upon the pitman 20. The pitman illustrated in the drawing is made up of structural steel of I-beam construction. On one side of said pitman is a plate 21 extending to a point spaced somewhat from the end of the pitman body and is there provided with a hinged connection with an arm 22 of the yoke. Said arm extends beyond the head of the pitman body and is curved to fit about the bearing member and has an opening 23 therein to receive the trunnions 19 of the bearing. The forward end is curved inwardly to meet the forward end of the opposite arm 24 of the yoke, said arms being extended outwardly and provided with openings to receive a clamping bolt 25 by means of which the two arms may be locked in position. The arm 24 has an opening therein to receive the opposite trunnion of the bearing and its inner end is secured to the body of the pitman by rivets 26 or other similar means. The arm 22 may be secured to the pitman body by an additional bolt 27, as shown.

When the pitman is to be assembled on the wrist pin, the bearing is itself assembled, as shown in Fig. 2, and placed over the outer end of the wrist pin. The cotter pin is then placed through the washer 16 and the wrist pin and the housing plate 10 then secured to the body of the housing. The bearing is then secured within the yoke, one trunnion being inserted within the arm 24 of the yoke and the opposite arm of the yoke being then swung inwardly on the hinge of the arm 22 to fit about the opposite trunnion, and the bolts 25 and 27 are then employed to tighten the structure in position. It will be noted that the bearing will have a universal connection between the pitman and the wrist pin. The rotation in one plane may take place about the axis of the wrist pin and in another plane about the axis of the bearing formed by the trunnions 19. If the parts are not in alignment during the operation of the pumping rig, the bearing will not bind upon the wrist pin.

To vary the stroke of the pump rod, the wrist pin must be inserted in different openings in the crank arm. When the wrist pin is thus changed it must be driven within the opening in the crank arm. In performing this operation, the nut 3 may be removed, and the pin forced in place by a blow delivered upon the outer face of the plate 10. The wrist pin may thus be forced through the opening without contact of the hammer directly with the pin and, when the plate 10 contacts directly with the end of the pin, as is done here, there is no strain upon the bearing or upon the housing 8 tending to distort it or impair its operation. It is also to be noted that the bearing may be lubricated through the opening shown at 29 in the outer plate.

The self-aligning feature and the means by which the bearing may be lubricated, and also the co-operation between the bearing plate and the end of the wrist pin whereby the wrist pin may be driven into position in the crank arm, are all features of value. It is also of value that the wrist pin may be easily removed from the pitman by detaching the arm 22 so that it may be swung on its hinge away from the bearing, leaving the bearing in position upon the wrist pin.

Having thus described my invention, what I claim as new and desire to protect by Letters Patent is:

1. A device of the character described including a wrist pin, a seat at one end thereof, a bearing on said seat, a housing enclosing said bearing, a pitman, a yoke on said pitman, a pivotal connection between said yoke and said bearing housing, and means carried by said housing to abut the end of said wrist pin whereby said pin may be driven into assembled position.

2. A device of the character described including a wrist pin, a seat at one end thereof, a bearing on said seat, a housing enclosing said bearing and said seat, means to retain said bearing and housing on said pin, a removable plate on said housing, a boss on said plate normally bearing against the outer end of said wrist pin, lateral bearings on said housing, a pitman head, and means engaging said head pivotally to said lateral bearings.

3. In a device of the character described, a wrist pin having one end shaped to fit within a crank arm, a bearing seat on the other end thereof, a bearing member thereon, a housing surrounding said bearing member, means on said pin adapted to retain said bearing member and housing in position on said seat, and means bearing against the end of said wrist pin to communicate a blow thereto.

4. In a device of the character described, a wrist pin adapted to be secured within a crank arm, a bearing on the outer end of said pin, a housing surrounding said bearing and held in position thereby, and lateral trunnions on said housing, a pitman, a yoke including arms, one of which has a hinged connection with said pitman, and bearings on said arms to pivotally receive said trunnions.

5. The combination of a wrist pin, a bearing seat thereon, a bearing member on said seat, a housing on said pin adapted to be retained thereon by said bearing, means to secure said bearing member on said pin, and means on said housing bearing against the end of said pin whereby it may be driven into assembled position.

6. The combination of a wrist pin, a bearing seat thereon, a bearing on said seat, a housing on said pin enclosing said bearing and adapted to be retained thereon by said bearing, means to secure said bearing on said pin, and a detachable cover plate on said housing, said plate acting to prevent inward movement of said housing.

7. The combination of a wrist pin, a bearing thereon, a housing enclosing said bearing, a pair of radial trunnions on said housing, a pitman, a stationary arm on said pitman, a second arm hinged to said pitman, bearing openings in said arms to receive said trunnions, and means to secure said arms together.

8. In a device of the character described, a wrist pin, a bearing housing thereon, a closed annular chamber between said wrist pin and said housing, a bearing in said chamber, a cap member for said housing including means to contact the end of said pin whereby said pin may be driven into an opening.

9. The combination of a wrist pin, a bearing housing on said wrist pin, a closed annular chamber between said housing and said wrist pin, and a bearing therein, a portion of said housing bearing against the end of said wrist pin whereby a blow can be transmitted from said housing to the end of said pin.

10. In a pitman connection, a wrist pin, adapted to be secured within a crank arm, a bearing on said wrist pin, a bearing housing thereon, a ring to confine said bearing and the end of said pin, and means on said housing adapted to having a driving contact with the end of said wrist pin.

In testimony whereof I hereunto affix my signature this 12th day of March A. D. 1927.

DICK K. CASON, Jr.